United States Patent [19]

Scanlan

[11] 4,046,344
[45] Sept. 6, 1977

[54] CONDUIT CLAMPING DEVICE

[76] Inventor: Robert J. Scanlan, 16350 Woodlawn East Drive, South Holland, Ill. 60473

[21] Appl. No.: 627,220

[22] Filed: Oct. 30, 1975

[51] Int. Cl.² .............................................. F16L 3/24
[52] U.S. Cl. ................................. 248/72; 248/74 R; 403/387; 403/400
[58] Field of Search ............... 403/387, 388, 391, 396, 403/397, 400; 52/760; 248/72, 74 R, 62

[56] References Cited

U.S. PATENT DOCUMENTS

| | | | |
|---|---|---|---|
| 1,793,932 | 2/1931 | Hite | 85/1 K |
| 3,417,951 | 12/1968 | Rebentisch, Jr. | 248/62 |
| 3,463,428 | 8/1969 | Kindorf et al. | 248/74 R |
| 3,486,726 | 12/1969 | Kindorf et al. | 248/72 |
| 3,527,432 | 9/1970 | Lytle | 248/62 |
| 3,547,385 | 12/1970 | Kindorf et al. | 248/62 |
| 3,650,499 | 3/1972 | Biggane | 248/74 R |

FOREIGN PATENT DOCUMENTS

| | | | |
|---|---|---|---|
| 670,887 | 1/1939 | Germany | 248/72 |

*Primary Examiner*—Andrew V. Kundrat
*Attorney, Agent, or Firm*—Leydig, Voit, Osann, Mayer & Holt, Ltd.

[57] ABSTRACT

A clamping device for securing a conduit in close transverse relation to the flat web portion of a C-shaped support channel. The clamping device includes two identical straps each having a curved section for engaging a side of the conduit, a leg extending in depending relation from the curved section, and a fastening flange extending from the opposite side of the curved section. An abutment flange extends from the leg of each strap such that when the straps are in mounted position on opposite sides of the conduit the abutment flanges are positionable in side by side relation and resist outward separation of the legs. For rigidly securing the straps in clamping engagement about the conduit, one of the strap fastening flanges captively carries a self-threading screw for insertion into an aperture in the opposite fastening flange located in slightly skewed relation thereto, whereby threadable engagement of the screw with the opposite flange pulls the fastening flanges together and draws the abutment flanges longitudinally into rigid abutting relation.

9 Claims, 5 Drawing Figures

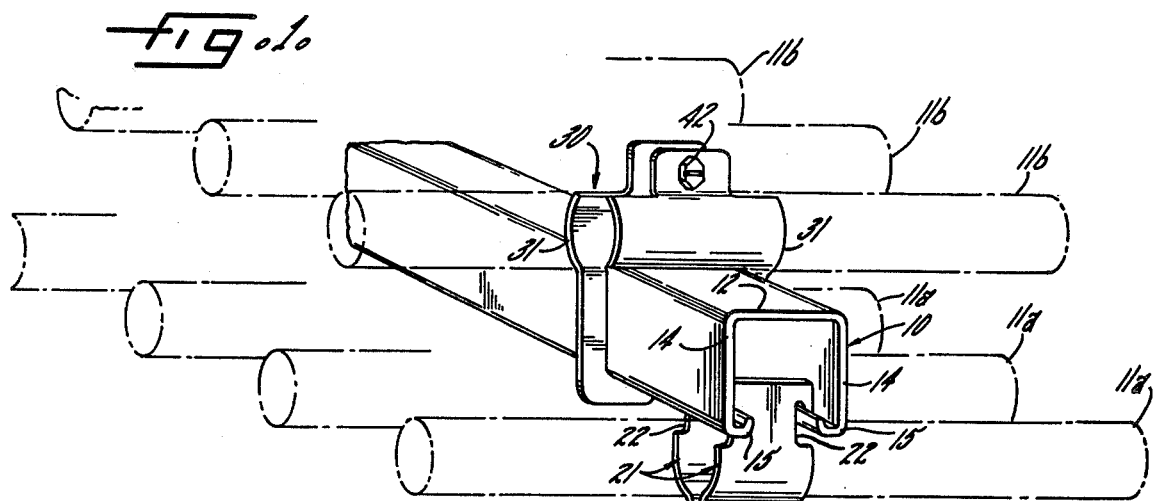
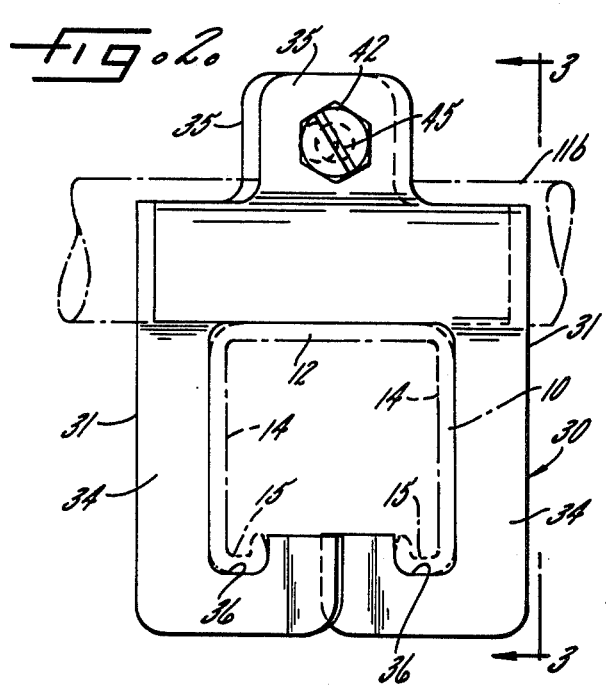
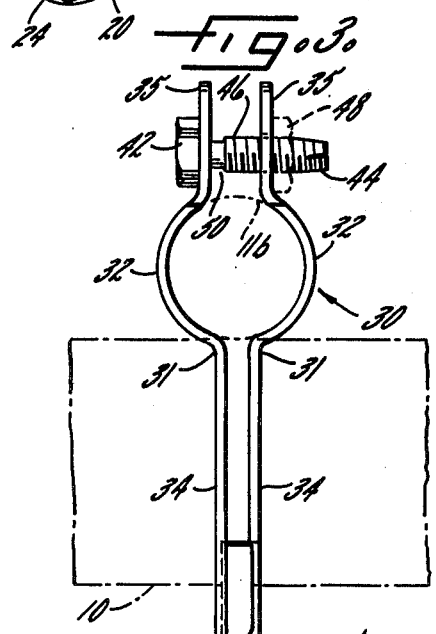
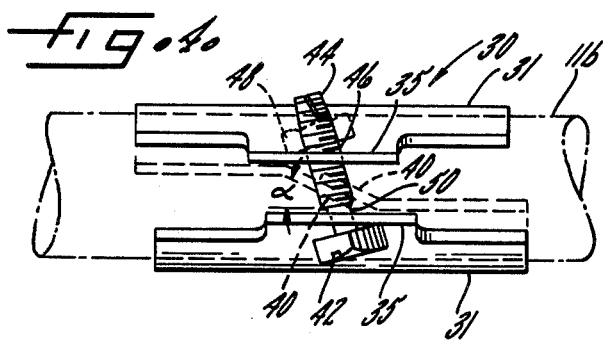
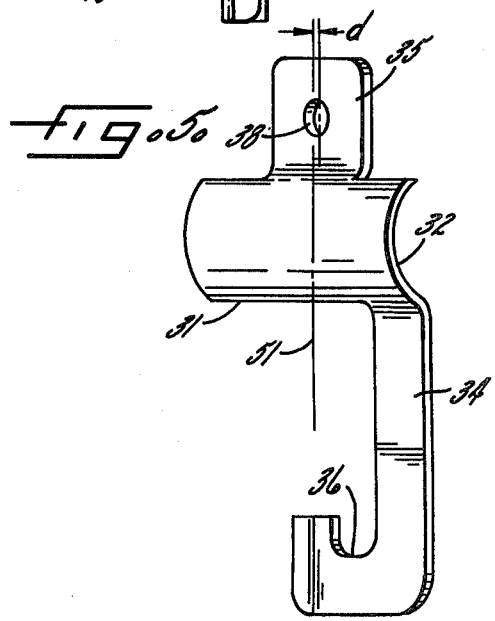

CONDUIT CLAMPING DEVICE

DESCRIPTION OF THE INVENTION

The present invention relates to conduit clamps, and more particularly, to improvements in conduit clamps used for securing pipes, conduits or cables to channel shaped support members.

It is common practice to support channels by clamping devices consisting of a pair of strap elements which are hung from one end in depending fashion from the legs of the support channel and which have means at their other end for clamping the conduit. Such clamps usually support the conduit directly below the ends of the channel legs in transverse relation to the channel.

With the vast number of wires required in modern buildings, it is desirable not only to support wire carrying conduits adjacent the underside ends of the channel legs, but also adjacent the opposite flat web side of the channel. Clamps which heretofore have been used for supporting conduits adjacent the channel web, however, have been relatively complex, costly, and have necessitated the use of a number of screws or other fastening elements. Since many overhead installations are located in or close to the ceiling, the installation of such clamping devices also often is awkward. It is not unusual for a workman to drop screws or other fastening elements during the installation, and if he is on a ladder at the time, the interruption and inconvenience is even greater.

It is an object of the present invention to provide a clamping device for more easily receiving and supporting conduits against the flat web portion of support channels.

Another object is to provide a conduit clamping device as characterized above which utilizes fewer removable parts so as to facilitate installation of the clamps.

A further object is to provide a clamping device of the above kind that can be used to secure conduits adjacent the web portion of a C-shaped channel while the channel also is utilized for the support of conduits adjacent the ends of the channel legs by conventional hangers.

Still another object is to provide a conduit clamping device of the foregoing type that supports the conduit adjacent the flat web channel portion without the necessity for drilling holes into the channel and which may thereby be closely positioned at any desired location on the channel.

Yet another object is to provide such a conduit clamping device that is economical to produce and can be readily installed without the need for special tools.

Other objects and advantages of the invention will become apparent upon reading the following detailed description and upon reference to the drawings, in which:

FIG. 1 is a partially diagrammatic perspective showing one tier of conduits which each are supported from the underside of a C-shaped channel by conventional hangers and a second tier of conduits which each are supported adjacent the upper web side of the channel by clamping devices embodying the present invention;

FIG. 2 is an enlarged side elevation of one of the clamping devices embodying the present invention;

FIG. 3 is a side elevational view of the clamping device shown in FIG. 2 taken in the plane of line 3—3;

FIG. 4 is a top view of the clamping device shown in FIG. 2; and

FIG. 5 is a perspective of one of the straps of the clamping device shown in FIGS. 2-4.

While the invention is susceptible of various modifications and alternative constructions, a certain illustrative embodiment thereof has been shown in the drawings and will be described below in detail. It should be understood, however, that there is no intention to limit the invention to the specific form disclosed, but, on the contrary, the intention is to cover all modifications, alternative constructions, and equivalents falling within the spirit and scope of the invention.

Referring now more particularly to FIG. 1 of the drawings, there is shown a C-shaped channel 10 that is utilized to support one tier of transversely disposed conduits 11a adjacent the underside thereof and a second tier of transverse conduits 11b adjacent the upper side of the channel. The channel 10 is of a conventional type having a web portion 12 and depending legs 14 which each terminate with inwardly bent flanges 15. The channel 10 in this case is disposed with the channel legs 14 directed downwardly and the web 12 on the topside. The channel 10 typically is supported at a desired location in a building under construction, such as in or near the ceiling, and the conduits serve to carry electrical wiring. It will be understood, however, that the conduits 11a, 11b could be water pipes, steam lines, sprinkler lines, or the like.

For supporting each conduit 11a in the lower tier from the channel, a conventional hanger 20 is employed. The hanger 20 in the present instance consists of two straps 21 each formed with slots 22 near one end that receive the opposed channel flanges 15 so as to enable the straps 21 to be supported in hanging relation from the channel 10. The straps 21 each are formed with a curved intermediate portion that engage opposite sides of a conduit 11a and the lower ends of the straps terminate in flanges 24 that have apertures through which a bolt extends for drawing the straps tightly about the conduit. A nut (not shown) is threaded onto the bolt in the usual manner to secure the straps in a clamped condition.

In accordance with the invention, a clamping device consisting of a pair of identical relatively simple straps is provided for rigidly securing each conduit of the upper tier adjacent the channel web so as to permit maximum utilization of the support channel. As best shown in FIGS. 2-5, the conduits 11b each are secured by a clamp 30 that includes two identical strap members 31. Each strap 31 has an elongated curved section 32 for engaging a side of the conduit, a depending leg 34 extending from one side of the curved section 32, and a fastening flange 35 extending upwardly from the opposite side of the curved section. The depending leg 34 of each strap has a U-shaped end 36 adapted to hook around one end 15 of a respective leg 14 of the support channel 10, and the fastening flange 35 of each strap is formed with an aperture 38.

In keeping with the invention, an abutment flange 40 extends inwardly from the end of each strap leg 34 such that when the straps are mounted about respective legs 14 of the support channel on opposite sides of a conduit 11b the flanges 40 are positionable in adjacent side by side relation to resist outward separation of strap legs 14. In this case, the leg 34 of each strap 31 is in a vertical plane when the strap is in mounted position and the abutment flange 40 of each strap extends at an acute angle α, such as about 15°, inwardly from the plane of the leg. Such angled abutment flanges 40 tend to facilitate mounting of the straps by in effect camming the strap ends into proper position, and more importantly, rigidly lock the legs 34 together to prevent their transverse outward movement when the straps are secured in their clamped condition, as will become apparent.

For securing the fastening flanges 35 together to rigidly clamp the conduit 11b in place, one strap flange 31 of each clamping device 30 captively carries a self-tapping screw 42 for threadably engaging the aperture 38 of the opposite strap. The screw 42 in this case has a hex head and a tapered self-threading end 44 of a known type. The hex head preferably also has a slot 45 so that it may be turned by either a wrench or screw driver. In addition to the self-tapping end 44, the screw is provided with a central length of standard uniform threads 46. This permits a nut 48, as shown in phantom in FIGS. 3 and 4, to be used with the screw in the event the threads at the self-tapping end should become stripped or otherwise fail to adequately secure the flange.

For allowing limited movement of the screw 42 with respect to the strap flange 35 in which it is held, the screw has a reduced diameter unthreaded section 50 extending from the head to the central threaded section 46. The screw may thereby be easily positioned relative to the aperture in the opposite fastening flange and may be started into the aperture without resistance from the flange in which it is held.

In accordance with still another feature of the invention, the fastening apertures 38 of each strap 31 are each located a slight distance d off of the strap center line 51 so that when the straps are in mounted position the apertures 38 are in slightly skewed relation, as shown in FIG. 4. The loose retention of the screw 42 by the fastening flange 35 in which it is held, as indicated above, permits the screw to be aligned with the aperture under such a skewed condition. Due to such skewed alignment, as the screw 42 is advanced into the opposite flange 35 the straps are not only drawn together in a transverse direction but also are pulled slightly in a longitudinal direction so as to insure rigid engagement of the abutment flanges 40. Then, when the screw 42 has tightly drawn the straps 31 about the conduit, a firm and rigid support for the conduit is achieved. It will be appreciated that the apertures 38 of each clamp, while off center, are similarly disposed relative to their respective center line so that the straps may be identically formed during their manufacture.

When installing each clamping device 30, a pair of the straps 31 may be positioned about opposite legs 14 of the support channel 10 with U-shaped strap ends 36 hooked around the channel leg ends 15 and the curved section 32 in opposed relation to the conduit 11b, as shown in FIG. 4. Since the fastening screw 42 is captively held in one of the straps 31, the self-threading end 44 may be positioned in the fastening aperture 38 of the opposite strap which will be in slightly skewed relation to the aperture 38 within which the screw is held. When the screw 42 is advanced into the aperture of the opposite strap, such as by a screw driver or wrench, the straps 31 are drawn tightly about the conduits and are also drawn toward each other in a longitudinal direction by reason of the skewed alignment of the fastening apertures 38 so as to force the abutment flanges 40 into firm engagement and create a rigid support for the conduit. Since the screw 42 is captively held in the strap, it will be seen that it is easily accessible to the workmen and cannot be dropped from the strap during installation, as often occurs when installing conventional clamping devices. In the unlikely event that the self-threading end 44 of the screw 42 becomes stripped or otherwise does not reliably secure the opposite strap, a conventional nut 48 may engage the central uniformly threaded section 46 of the screw to insure reliable clamping engagement of the straps about the conduit.

From the foregoing, it will be seen that the clamping device of the present invention is adapted for easy installation and reliable securement of conduits against the flat web portion of conventional support channels. The clamping device also facilitates maximum utilization of the support channel since it may be easily positioned between conventional hangers which support conduits adjacent the ends of the channel legs. Since the clamping device requires no apertures in the support channel, they may be positioned at any desired close spacing along the channel. By reason of the identical, relatively simple form of the straps, they also may be economically produced.

I claim as my invention:

1. A clamping device for securing a conduit to a support channel having a pair of spaced legs interconnected by a web with the conduit being disposed transversely to said channel and substantially adjacent the web thereof, comprising
   first and second straps each having a curved portion for engaging a side of said conduit, a leg extending from one side of said curved portion, and a fastening element at the opposite side thereof;
   said leg of each strap having a generally U-shaped end for engaging the end of a respective one of said channel legs;
   an abutment flange extending from each strap leg such that when said straps are mounted on said channel on opposite sides of a conduit to be secured said abutment flanges are positionable in side by side abutting relation with the abutment flange of said first strap being on an opposite side of said second strap flange than the curved portion of said first strap is located with respect to the curved portion of said second strap whereby said strap legs are prevented from moving outwardly relative to each other and the conduit therebetween; and
   means for securing said strap fastening elements to rigidly clamp said conduit between said strap curved portions and hold said abutting flanges in rigid engagement.

2. The clamping device of claim 1 in which said fastening element of each strap includes a fastening flange extending from said curved portion, said fastening flange of each strap being formed with an aperture, and a screw captively carried in the aperture of one of said straps for threadable engagement with the aperture of the other of said straps.

3. The clamping device of claim 2 in which said screw has a tapered self-tapping end.

4. The clamping device of claim 5 in which said screw has a uniformly threaded section immediately adjacent said tapered self-threading end for receiving a nut.

5. The clamping device of claim 4 in which said screw has a reduced diameter unthreaded portion between said uniformly threaded section and the head thereof, and said screw is captively held in said strap flange at said reduced diameter portion for limited relative movement.

6. The clamping device of claim 1 in which said straps are of identical construction.

7. A clamping device for securing a conduit to a support channel having a pair of spaced legs interconnected by a web with the conduit being disposed transversely to said channel and substantially adjacent the web thereof, comprising a pair of straps each having a curved portion for engaging a side of said conduit, a leg extending from one side of said curved portion, and a fastening element at the opposite side thereof;

said leg of each strap having a generally U-shaped end for engaging the end of a respective one of said channel legs, said strap legs being disposed in parallel relation when the straps are in mounted conduit securing position;

an abutment flange extending from each strap leg at an acute angle relative to its respective strap leg such that when said straps are mounted on said channel in opposed relation to a conduit said abutment flanges are interlocked with each other in side by side abutting relation for preventing outward separation of said strap legs; and means for securing said strap fastening elements to rigidly clamp said conduit between said strap curved portions and hold said abutting flanges in rigid engagement.

8. The clamping device of claim 7 in which said abutment flanges each extend inwardly toward each other at an angle of about 15° relative to its respective support leg.

9. A clamping device for securing a conduit to a support channel having a pair of spaced legs interconnected by a web with the conduit being disposed transversely to said channel and substantially adjacent the web thereof, comprising a pair of straps each having a curved portion for engaging a side of said conduit, a leg extending from one side of said curved portion, and a fastening element at the opposite side thereof;

said leg of each strap having a generally U-shaped end for engaging the end of a respective one of said channel legs;

an abutment flange extending from each strap leg such that when said straps are mounted on said channel in opposed relation to a conduit said abutment flanges are positionable in side by side abutting and interlocked relation with each other for preventing outward separation of said strap legs; and said fastening element of each strap including a fastening flange extending from said curved portion, said fastening flange of each strap being formed with an aperture, a screw captively carried in the aperture of one of said straps for threadable engagement with the aperture of the other of said straps, and said aperture of each strap fastening flange being in slight off-centered relation to the strap such that when the straps are in mounted position said apertures are in skewed relation whereby tightening of said screw causes said strap curved portions to rapidly clamp a conduit interposed therebetween while maintaining said abutting flanges in rigid engagement.

* * * * *